US011879294B2

(12) United States Patent
Huang et al.

(10) Patent No.: US 11,879,294 B2
(45) Date of Patent: Jan. 23, 2024

(54) WINDOW SHADE AND ACTUATING SYSTEM THEREOF

(71) Applicant: Teh Yor Co., Ltd., New Taipei (TW)

(72) Inventors: Chung-Chen Huang, New Taipei (TW); Kuan-Yu Liu, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 59 days.

(21) Appl. No.: 17/666,973

(22) Filed: Feb. 8, 2022

(65) Prior Publication Data

US 2022/0251900 A1 Aug. 11, 2022

Related U.S. Application Data

(60) Provisional application No. 63/148,353, filed on Feb. 11, 2021.

(51) Int. Cl.

*E06B 9/32* (2006.01)
*E06B 9/322* (2006.01)
*E06B 9/262* (2006.01)

(52) U.S. Cl.

CPC .............. *E06B 9/322* (2013.01); *E06B 9/262* (2013.01); *E06B 2009/2627* (2013.01)

(58) Field of Classification Search

CPC ... E06B 9/322; E06B 9/262; E06B 2009/2627
See application file for complete search history.

(56) References Cited

U.S. PATENT DOCUMENTS 8,356,653 B2 * 1/2013 Fu-Lai .................... E06B 9/322 160/84.05
9,284,774 B2 * 3/2016 Yu ........................... E06B 9/322
11,598,145 B2 * 3/2023 Huang .................... E06B 9/322
2009/0242332 A1 10/2009 Anderson et al.
2013/0220561 A1 8/2013 Yu et al.

(Continued)

FOREIGN PATENT DOCUMENTS

CN 105089476 A 11/2015
TW 201335475 A 9/2013
TW 201619489 A 6/2016

OTHER PUBLICATIONS

International Search Report in the parent PCT application No. PCT/US2022/015619, dated May 9, 2022.

(Continued)

*Primary Examiner* — Beth A Stephan
(74) *Attorney, Agent, or Firm* — Chen Yoshimura LLP

(57) ABSTRACT

An actuating system includes a sleeve, a braking part for applying a braking force to prevent rotation of the sleeve, a brake releasing part, an axle coupler and an engaging part. The brake releasing part is operable to cause the braking part to release the braking force for rotation of the sleeve. The axle coupler is disposed through the sleeve, and is rotatable for raising and lowering a movable rail of a window shade. The engaging part is disposed between and can be in rolling contact with the axle coupler and the sleeve. The engaging part has a coupling position with respect to the axle coupler where the sleeve and the axle coupler are locked to each other in a first direction of rotation, and is movable away from the coupling position for rotation of the axle coupler relative to the sleeve in a second direction of rotation.

20 Claims, 19 Drawing Sheets

(56) References Cited

U.S. PATENT DOCUMENTS

| | | | |
|---|---|---|---|
| 2016/0017964 | A1 | 1/2016 | Yu et al. |
| 2016/0138331 | A1 | 5/2016 | Huang et al. |

OTHER PUBLICATIONS

Written Opinion in the parent PCT application No. PCT/US2022/015619, dated May 9, 2022.
Taiwanese Office Action, dated Dec. 7, 2022, in a counterpart Taiwanese patent application, No. TW 111104559. (English translation of the search report is appended after the Chinese language document in the same PDF.).

* cited by examiner

WINDOW SHADE AND ACTUATING SYSTEM THEREOF

CROSS-REFERENCE TO RELATED APPLICATION(S)

This application claims priority to U.S. provisional patent application No. 63/148,353 filed on Feb. 11, 2021, the disclosure of which is hereby incorporated by reference.

BACKGROUND

1. Field of the Invention

The present invention relates to window shades, and actuating systems used in window shades.

2. Description of the Related Art

Some window shades may use an operating cord for raising a bottom part of the window shade and a wand for lowering the bottom part. More specifically, the operating cord may be pulled downward to drive a rotary part in rotation, which can be transmitted to a drive axle so that the drive axle can rotate for winding a suspension cord connected with the bottom part. When a user rotates the wand, an arrester coupled to the wand can release the drive axle, which can accordingly rotate as the bottom part lowers under gravity action.

In the aforementioned type of window shades, the braking force of the arrester may create resistance against the rotation of the drive axle when the rotary part and the drive axle rotate for raising the bottom part. As a result, the pulling force applied by the user has to overcome the braking force to be able to raise the bottom part, which may require increased effort from the user.

SUMMARY

The present application describes a window shade and an actuating system for use with the window shade that can reduce internal friction so that component wear can be reduced and the actuating system can be operated with reduced effort.

According to an embodiment, the actuating system includes a sleeve having an inner surface, a braking part operable to apply a braking force for preventing rotation of the sleeve, a brake releasing part, an axle coupler and at least an engaging part. The brake releasing part is connected with the braking part, and is operable to cause the braking part to release the braking force for rotation of the sleeve around a rotation axis. The axle coupler is disposed through an interior of the sleeve, and is rotatable around the rotation axis for raising and lowering a movable rail of a window shade. The engaging part is disposed between the axle coupler and the inner surface of the sleeve, and is adapted to be in rolling contact with the axle coupler and the inner surface of the sleeve. The engaging part has a coupling position with respect to the axle coupler where the sleeve and the axle coupler are locked to each other in a first direction of rotation, and is movable relative to the axle coupler away from the coupling position for rotation of the axle coupler relative to the sleeve in a second direction of rotation opposite to the first direction of rotation.

Moreover, the application describes a window shade that incorporates the actuating system.

DETAILED DESCRIPTION OF THE EMBODIMENTS

Figure 1:
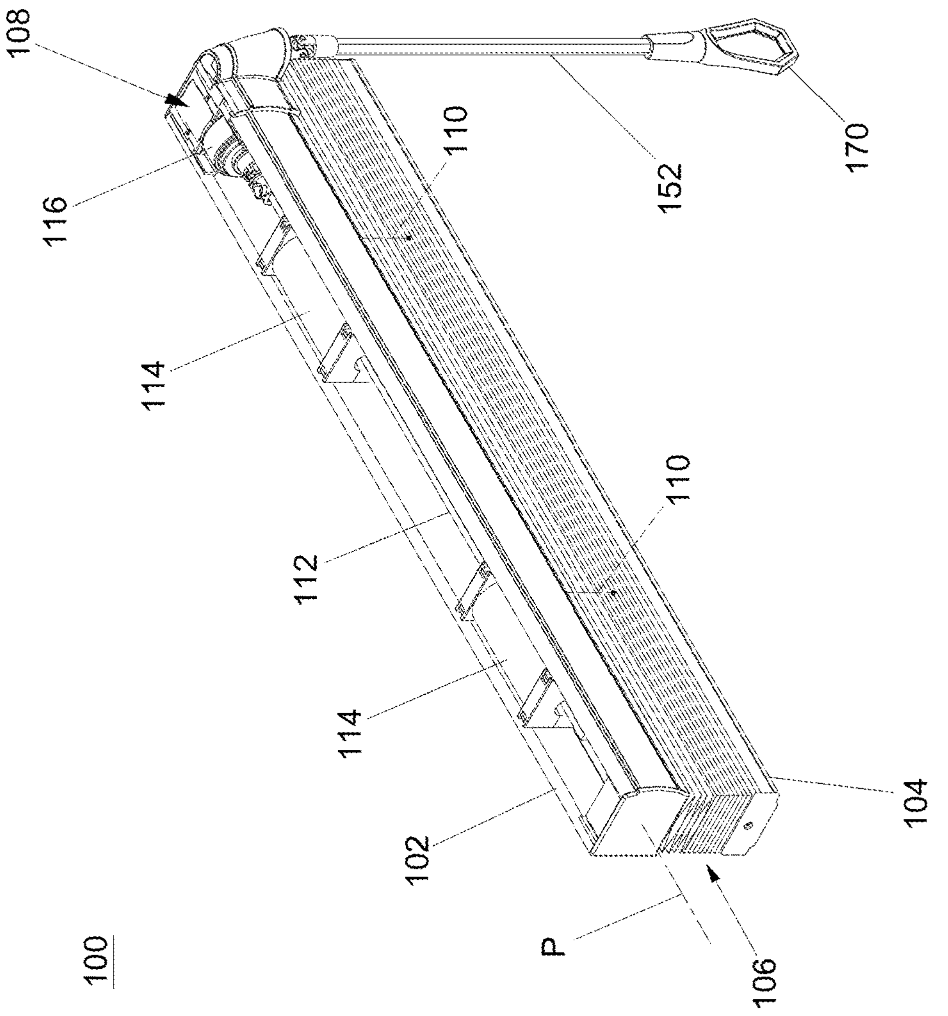
FIG. 1 is a perspective view illustrating an embodiment of a window shade.
Figure 2:
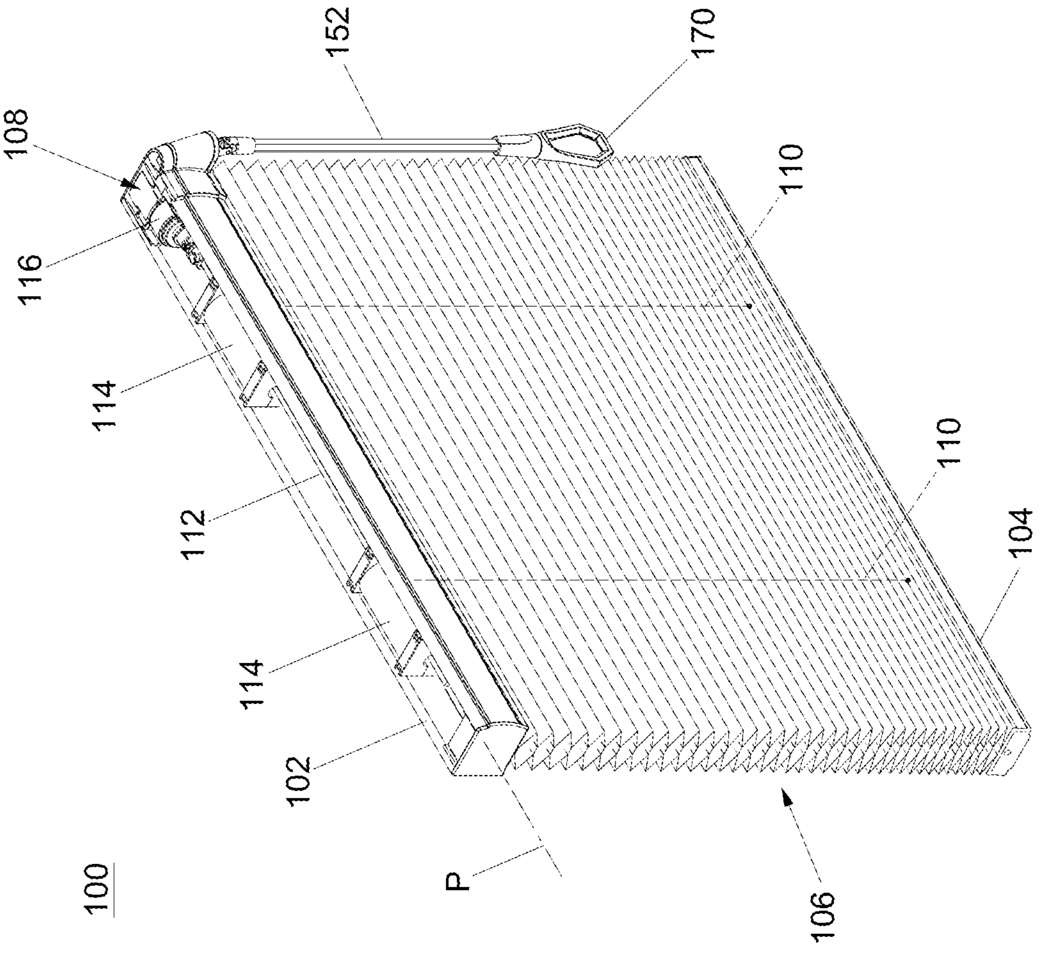
FIG. 2 is a perspective view illustrating the window shade having a movable rail lowered from a head rail.

FIGS. 1 and 2 are perspective views respectively illustrating an embodiment of a window shade 100 in different states. Referring to FIGS. 1 and 2, the window shade 100 can include a head rail 102, a movable rail 104, a shading structure 106 and an actuating system 108.

The head rail 102 may be affixed at a top of a window frame, and can have any desirable shapes. According to an example of construction, the head rail 102 can have an elongate shape including a cavity for at least partially receiving the actuating system 108 of the window shade 100.

The movable rail 104 can be suspended from the head rail 102 with a plurality of suspension elements 110 (shown with phantom lines in FIGS. 1 and 2), and can have any suitable shapes. According to an example of construction, the movable rail 104 may be an elongate rail having a channel adapted to receive to the attachment of the shading structure 106. Examples of the suspension elements 110 may include, without limitation, cords, strips, bands, and the like. In the illustrated embodiment, the movable rail 104 is disposed at a lowermost location and forms a bottom part of the window shade 100. However, it will be appreciated that other shade elements may be disposed below the movable rail 104 as needed.

The shading structure 106 may exemplary have a cellular structure, which may include, without limitation, honeycomb structures. However, it will be appreciated that the shading structure 106 may have any suitable structure that can be expanded and collapsed between the movable rail 104 and the head rail 102. The shading structure 106 can be disposed between the head rail 102 and the movable rail 104, and can have two opposite ends respectively attached to the head rail 102 and the movable rail 104.

Referring to FIGS. 1 and 2, the movable rail 104 is movable vertically relative to the head rail 102 for setting the window shade 100 to a desirable configuration. For example, the movable rail 104 may be raised toward the head rail 102 to collapse the shading structure 106 as shown in FIG. 1, or lowered away from the head rail 102 to expand the shading structure 106 as shown in FIG. 2. The vertical position of the movable rail 104 relative to the head rail 102 may be controlled with the actuating system 108.

Referring to FIGS. 1 and 2, the actuating system 108 is assembled with the head rail 102, and is operable to displace the movable rail 104 relative to the head rail 102 for adjustment. The actuating system 108 can include a rotary axle 112, a plurality of winding units 114 rotationally coupled to the rotary axle 112, and a control module 116 coupled to the rotary axle 112.

The rotary axle 112 is respectively coupled to the winding units 114 in the head rail 102, and can rotate about a rotation axis P. Each of the winding units 114 is respectively connected with the movable rail 104 via one suspension element 110, and is operable to wind the suspension element 110 for raising the movable rail 104 and to unwind the suspension element 110 for lowering the movable rail 104. For example, the winding unit 114 may include a rotary drum (not shown) that is rotationally coupled to the rotary axle 112 and is connected with one end of the suspension element 110, and another end of the suspension element 110 can be connected with the movable rail 104, whereby the rotary drum can rotate along with the rotary axle 112 to wind or unwind the suspension element 110. Since the winding units 114 are commonly coupled to the rotary axle 112, the winding units 114 can operate in a concurrent manner for winding and unwinding the suspension elements 110. The movable rail 104 can be thereby coupled to the rotary axle 112, which can rotate for raising and lowering the movable rail 104.

Figure 3:
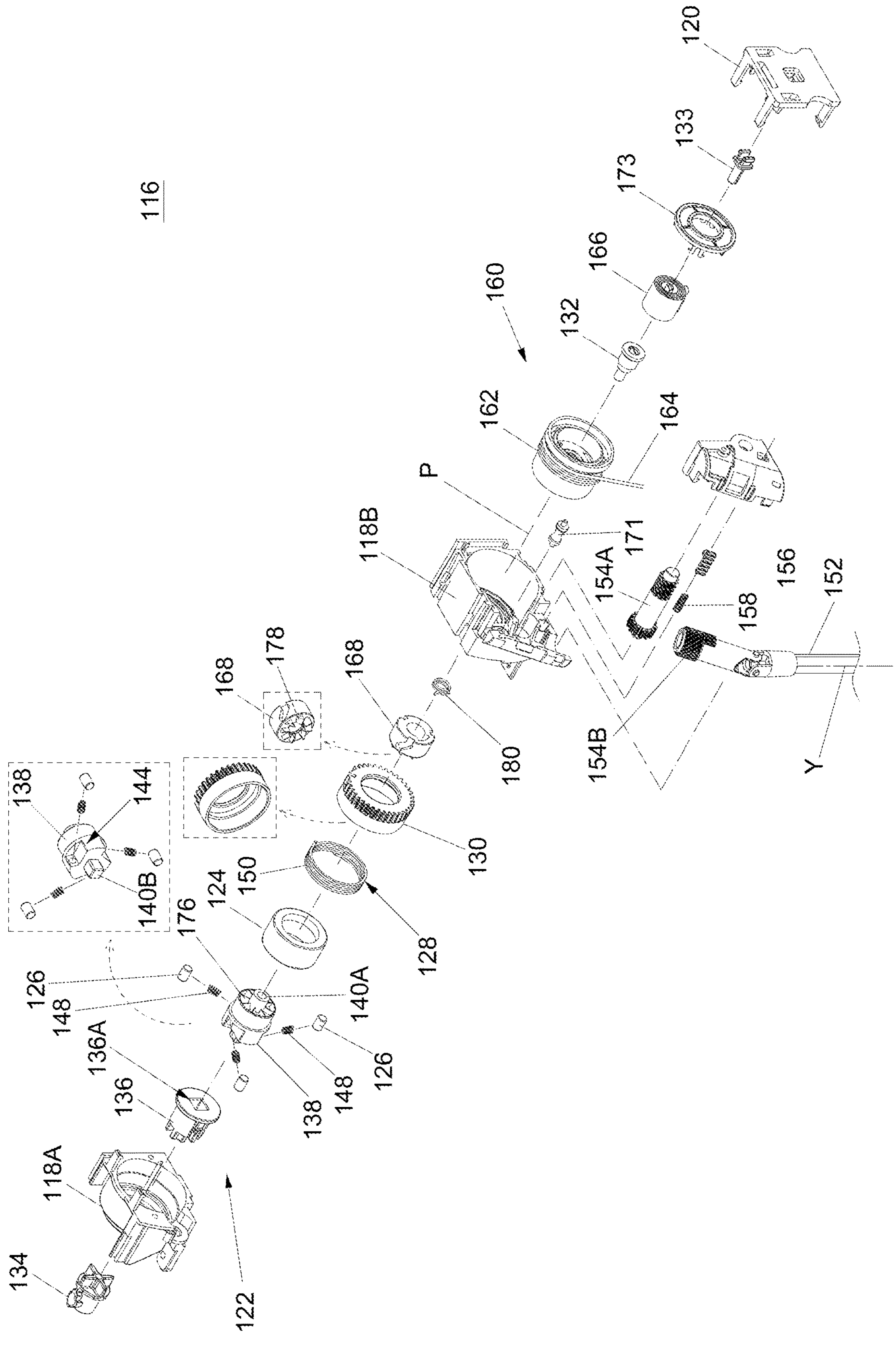
FIG. 3 is an exploded view illustrating a control module of an actuating system provided in the window shade.
Figure 4:
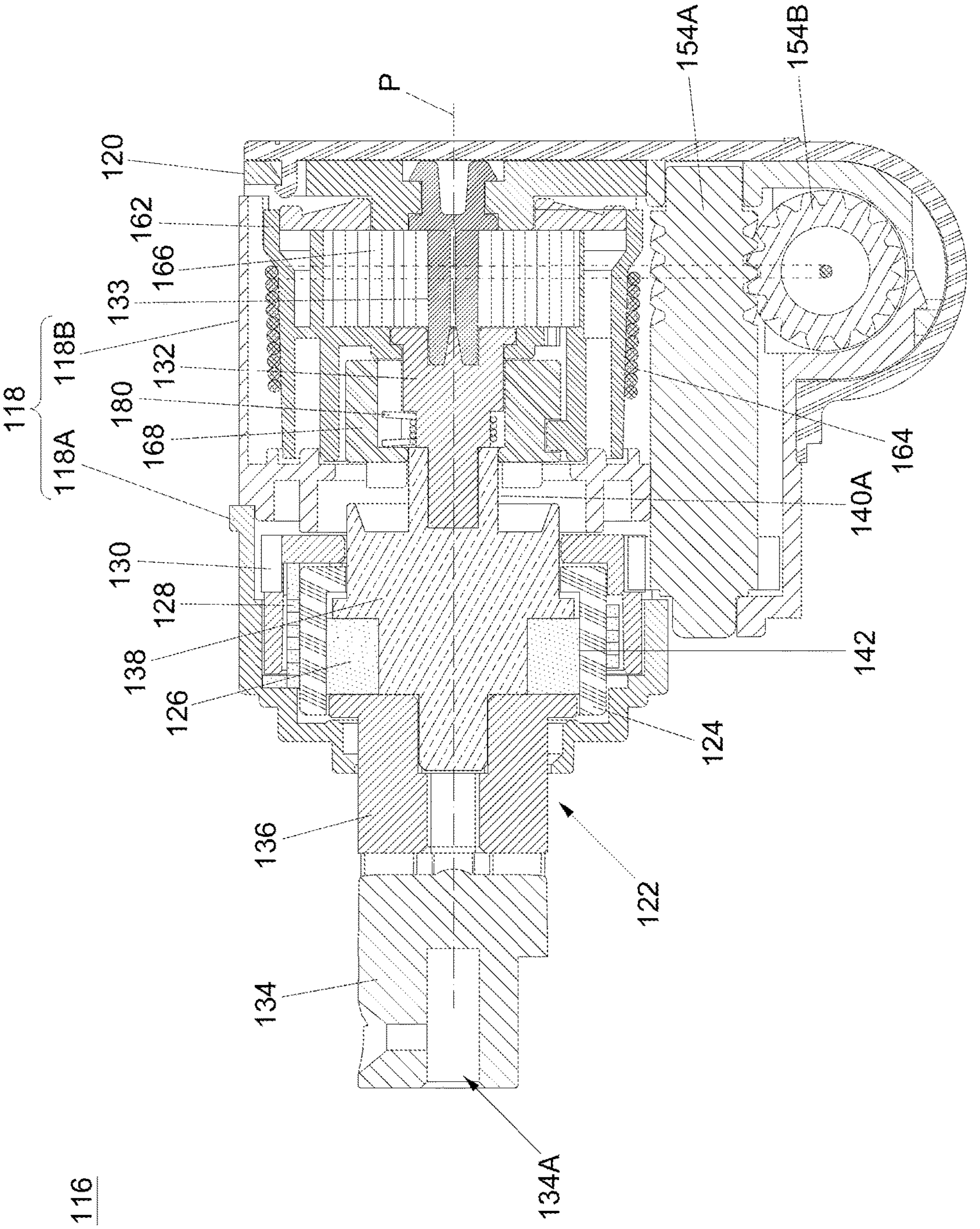
FIG. 4 is a cross-sectional view illustrating the control module shown in FIG. 3.

The control module 116 is coupled to the rotary axle 112, and is operable to cause the rotary axle 112 to rotate in either direction about the rotation axis P for raising or lowering the movable rail 104. In conjunction with FIGS. 1 and 2, FIG. 3 is an exploded view illustrating a construction of the control module 116, and FIG. 4 is a cross-sectional view of the control module 116. Referring to FIGS. 1-4, the control module 116 can include a housing 118 that can be affixed to the head rail 102. The housing 118 can exemplarily include a plurality of housing portions 118A and 118B affixed to one another to define a cavity adapted to receive at least some component parts of the control module 116, wherein the cavity can be closed at one side with a bracket 120.

Referring to FIGS. 3 and 4, the control module 116 can include an axle coupler 122, a sleeve 124, a plurality of engaging parts 126, a braking part 128 and a brake releasing part 130.

The axle coupler 122 is received at least partially inside the cavity of the housing 118, and can extend outward for connection with the rotary axle 112. The axle coupler 122 can be rotationally locked to the rotary axle 112 so that the rotary axle 112 and the axle coupler 122 are rotatable in unison around the rotation axis P for raising and lowering the movable rail 104 of the window shade 100. For example, a fixed shaft 132 can be fixedly connected with the bracket 120 with a fastening rod 133, and the axle coupler 122 can be pivotally connected around one section of the fixed shaft 132 so as to be rotatable along with the rotary axle 112 about the rotation axis P.

According to an example of construction, the axle coupler 122 can include a plurality of coupling parts 134, 136 and 138 connected with one another. The coupling parts 134 and 136 can be rotationally locked to each other, and the rotary axle 112 may have an end that can be received in an opening 134A of the coupling part 134 for attachment thereto. The coupling part 138 can have a tubular portion 140A at one side that can be pivotally connected around one section of the fixed shaft 132, and a rectangular protrusion 140B at an opposite side that is received inside a rectangular opening 136A of the coupling part 136 for rotationally coupling the coupling part 138 to the coupling part 136. The use of multiple coupling parts 134, 136 and 138 may facilitate the assembly of the axle coupler 122. The axle coupler 122 including the coupling parts 134, 136 and 138 can rotate along with the rotary axle 112 in either direction about the rotation axis P.

Referring to FIGS. 3 and 4, the sleeve 124 can have an inner surface 142 of a generally cylindrical shape that surrounds a hollow interior of the sleeve 124, and is disposed for rotation around the rotation axis P. More specifically, the sleeve 124 is mounted around the axle coupler 122, which extends axially through the interior of the sleeve 124. For example, the coupling parts 136 and 138 of the axle coupler 122 can be received at least partially through the interior of the sleeve 124. The axle coupler 122 and the sleeve 124 are arranged so that relative rotation between the axle coupler 122 and the sleeve 124 is allowed.

Figure 5:
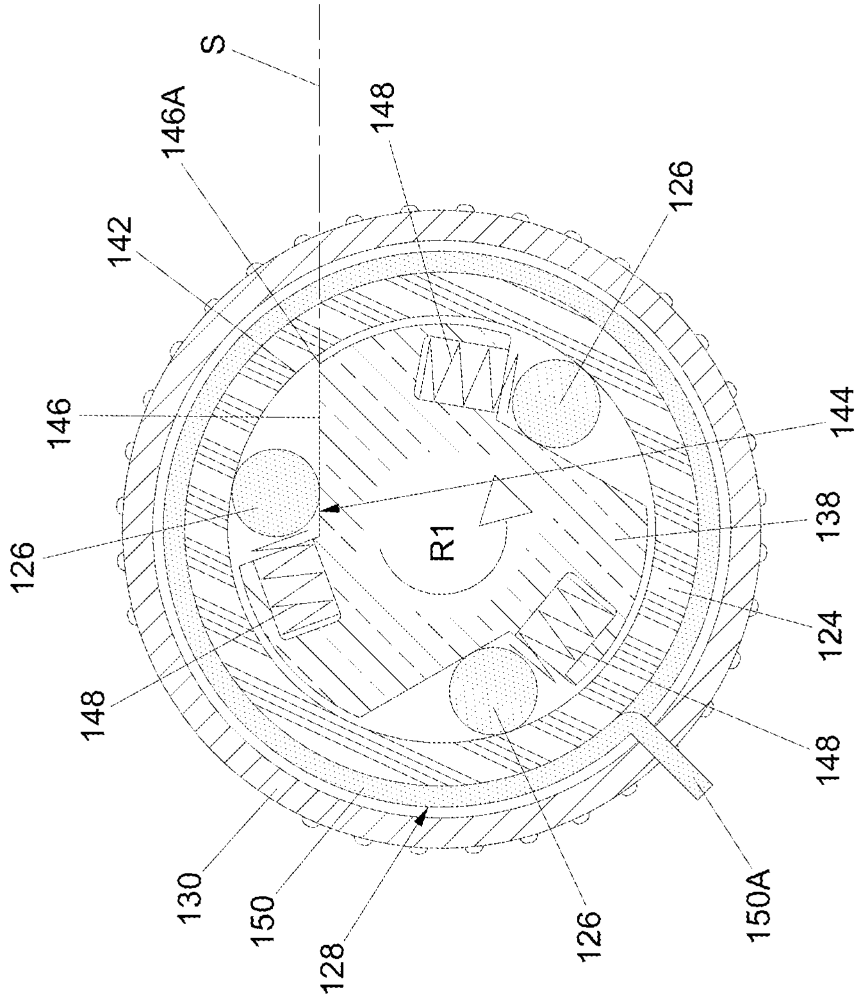
FIG. 5 is a cross-sectional view taken along a section plane perpendicular to that of FIG. 4 illustrating the assembly of an axle coupler, a sleeve and engaging parts in the control module of FIG. 3.

In conjunction with FIGS. 3 and 4, FIG. 5 is a cross-sectional view illustrating the assembly of the axle coupler 122, the sleeve 124 and the engaging parts 126. Referring to FIGS. 3-5, the engaging parts 126 are disposed between the axle coupler 122 and the inner surface 142 of the sleeve 124, and are angularly spaced apart from one another around the rotation axis P. The engaging parts 126 are adapted to be in rolling contact with the axle coupler 122 and the inner surface 142 of the sleeve 124 and can include any rolling elements, which may exemplarily include, without limitation, rolling pins or balls. According to an example of construction, the engaging parts 126 may be rolling pins adapted to be in rolling contact with the coupling part 138 of the axle coupler 122 and the inner surface 142 of the sleeve 124.

The engaging parts 126 are respectively movable relative to the axle coupler 122 to rotationally couple the axle coupler 122 to the sleeve 124 or rotationally decouple the axle coupler 122 from the sleeve 124. In particular, each engaging part 126 can have a coupling position with respect to the axle coupler 122 where the axle coupler 122 and the sleeve 124 are locked to each other in a direction of rotation R1, and the engaging part 126 is movable relative to the axle coupler 122 away from the coupling position for rotation of the axle coupler 122 relative to the sleeve 124 in a direction R2 (better shown in FIG. 6) opposite to the direction R1. The direction of rotation R1 can correspond to lowering of the movable rail 104, and the direction of rotation R2 can correspond to raising of the movable rail 104.

Figure 6:
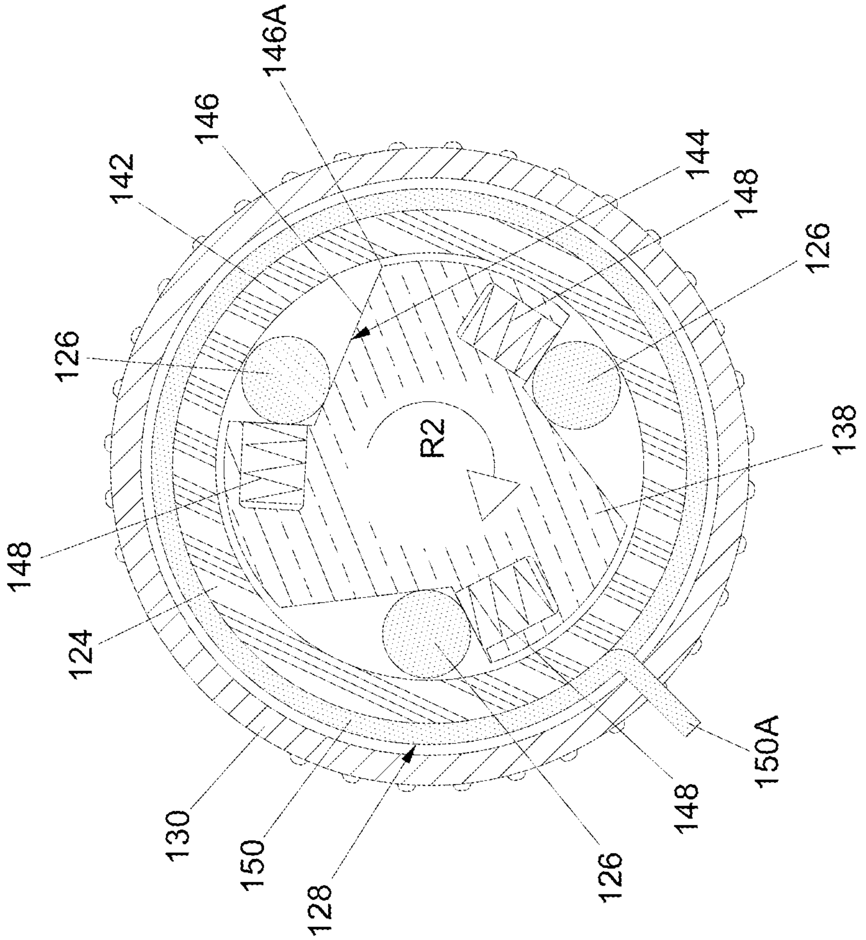
FIG. 6 is a cross-sectional view illustrating the elements shown in FIG. 5 in a different state.

Referring to FIGS. 3-5, the axle coupler 122 can have a plurality of notches 144 respectively associated with the engaging parts 126. The notches 144 can be exemplarily provided on the coupling part 138 of the axle coupler 122. Each notch 144 and the inner surface 142 of the sleeve 124 can at least partially define a gap where the corresponding engaging part 126 is confined. More specifically, each notch 144 can have a notch surface 146 that extends along a secant line S of the inner surface 142 so that the gap formed by the notch 144 and the inner surface 142 can have a deeper gap portion and a shallower gap portion. The engaging part 126 within each gap can be displaced toward an end 146A of the notch surface 146 adjacent to the inner surface 142 (i.e., toward the shallower gap portion) in the coupling position, and can be displaced away from the end 146A of the notch surface 146 toward the deeper gap portion when the axle coupler 122 rotates relative to the sleeve 124 in the direction R2 (better shown in FIG. 6). FIG. 5 illustrates the engaging part 126 in the coupling position, and FIG. 6 illustrates the engaging part 126 displaced toward the deeper gap portion. In the coupling position, the engaging part 126 can contact against the notch surface 146 and the inner surface 142 of the sleeve 124 to create a friction adapted to rotationally lock the axle coupler 122 to the sleeve 124 in the direction of rotation R1. When the engaging part 126 is displaced to the deeper gap portion, the contact between the engaging part 126 and each of the notch surface 146 and the inner surface 142 of the sleeve 124 creates a friction that is less than the friction in the coupling position, which allows the axle coupler 122 to rotate relative to the sleeve 124 in the direction R2 while the sleeve 124 is held stationary.

Referring to FIGS. 3-6, the engaging parts 126 can be respectively connected with a plurality of springs 148, wherein each spring 148 can be respectively connected with the corresponding engaging part 126 and the axle coupler 122 and is adapted to bias the engaging part 126 toward the coupling position.

Referring to FIGS. 3-5, the braking part 128 and the brake releasing part 130 are connected with each other, the braking part 128 being operable to apply a braking force for preventing rotation of the sleeve 124, and the brake releasing part 130 being operable to cause the braking part 128 to release the braking force for rotation of the sleeve 124 around the rotation axis P. According to an example of construction, the braking part 128 can include a braking spring 150 that is tightly disposed around the sleeve 124 and has two ends respectively connected with the housing 118 and the brake releasing part 130 (the end 150A of the braking spring 150 connected with the brake releasing part 130 is better shown in FIGS. 5 and 6). The frictional contact between the sleeve 124 and the braking spring 150 can create a braking force for preventing rotation of the sleeve 124 around the rotation axis P, and the brake releasing part 130 is operable to cause the braking spring 150 to loosen the frictional contact with the sleeve 124 for rotation of the sleeve 124. In particular, the brake releasing part 130 can be operated to cause the braking part 128 to release the sleeve 124 so that the axle coupler 122 and the sleeve 124 can rotate in unison relative to the braking part 128 in the direction R1 for lowering the movable rail 104.

Referring to FIGS. 3 and 4, the brake releasing part 130 can be disposed in the housing 118 for rotation around the rotation axis P. According to an example of construction, the brake releasing part 130 can have a circular shape. However, other shapes may be suitable, e.g., a semicircular shape, a curved shape, and the like. The brake releasing part 130 can rotate around the rotation axis P to cause the braking part 128 to release the braking force for rotation of the sleeve 124.

Referring to FIGS. 1-5, the control module 116 can further include a control wand 152 connected with the brake releasing part 130 via a plurality of transmission elements 154A and 154B, whereby the control wand 152 is operable to cause the brake releasing part 130 to rotate around the rotation axis P and thereby urge the braking spring 150 to loosen the frictional contact with the sleeve 124. For example, the transmission elements 154A and 154B can include gear elements, and the control wand 152 is rotatable around a lengthwise axis Y thereof for urging the braking spring 150 to loosen the frictional contact with the sleeve 124.

Figure 7:
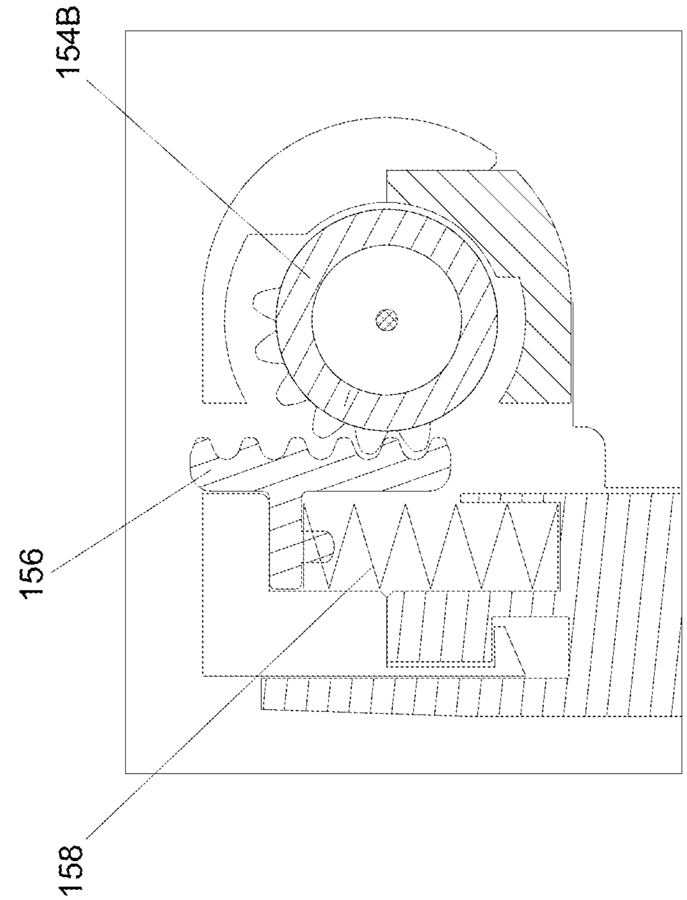
FIG. 7 is a cross-sectional view illustrating further construction details of the control module shown in FIG. 3.

Referring to FIGS. 3, 4 and 7, one of the transmission elements 154A and 154B may be coupled to a biasing spring that exerts a spring force for assisting the control wand 152 to recover an initial position when no external force is applied thereon, wherein the initial position of the control wand 152 can correspond to a braking state of the braking part 128. For example, the transmission element 154B may have a toothed portion meshed with a rack element 156, and the rack element 156 can be connected with a biasing spring 158. When no external force is applied on the control wand 152, the biasing spring 158 can urge the rack element 156 to slide and cause the transmission element 154B to rotate, which in turn can cause the control wand 152 to recover its initial position and the braking part 128 to recover the braking state.

Referring to FIGS. 3-6 and 8-10, the control module 116 can further include a drive unit 160 operable to rotationally couple to and rotationally decouple from the axle coupler 122, the drive unit 160 being rotationally coupled to the axle coupler 122 for urging the axle coupler 122 to rotate in the direction R2. The drive unit 160 can include a spool 162, a pull member 164, a spring 166 and a clutching part 168.

The spool 162 can be disposed inside the housing 118 for rotation about the rotation axis P, and can be connected with the pull member 164. The pull member 164 is a flexible element, which can include, without limitation, a cord, a strip, a band, and the like. The pull member 164 can extend through a hollow interior of the control wand 152, and can have two opposite ends respectively connected with the spool 162 and a handle 170 (better shown in FIGS. 1 and 2) that is exposed for operation by a user. A guiding member 171 may be provided inside the housing 118 for guiding the pull member 164. The spool 162 is rotatable about the rotation axis P to wind and unwind at least partially the pull member 164, and the pull member 164 is operable to drive the spool 162 to rotate in the unwinding direction.

The spring 166 can be disposed inside a cavity of the spool 162, and can bias the spool 162 to rotate for winding at least partially the pull member 164. According to an example of construction, the spring 166 may be a ribbon spring that is respectively connected with the fastening rod 133 and the spool 162. A positioning bracket 173 may be fixedly attached to the bracket 120 for restricting the position of the spring 166.

Figure 8:
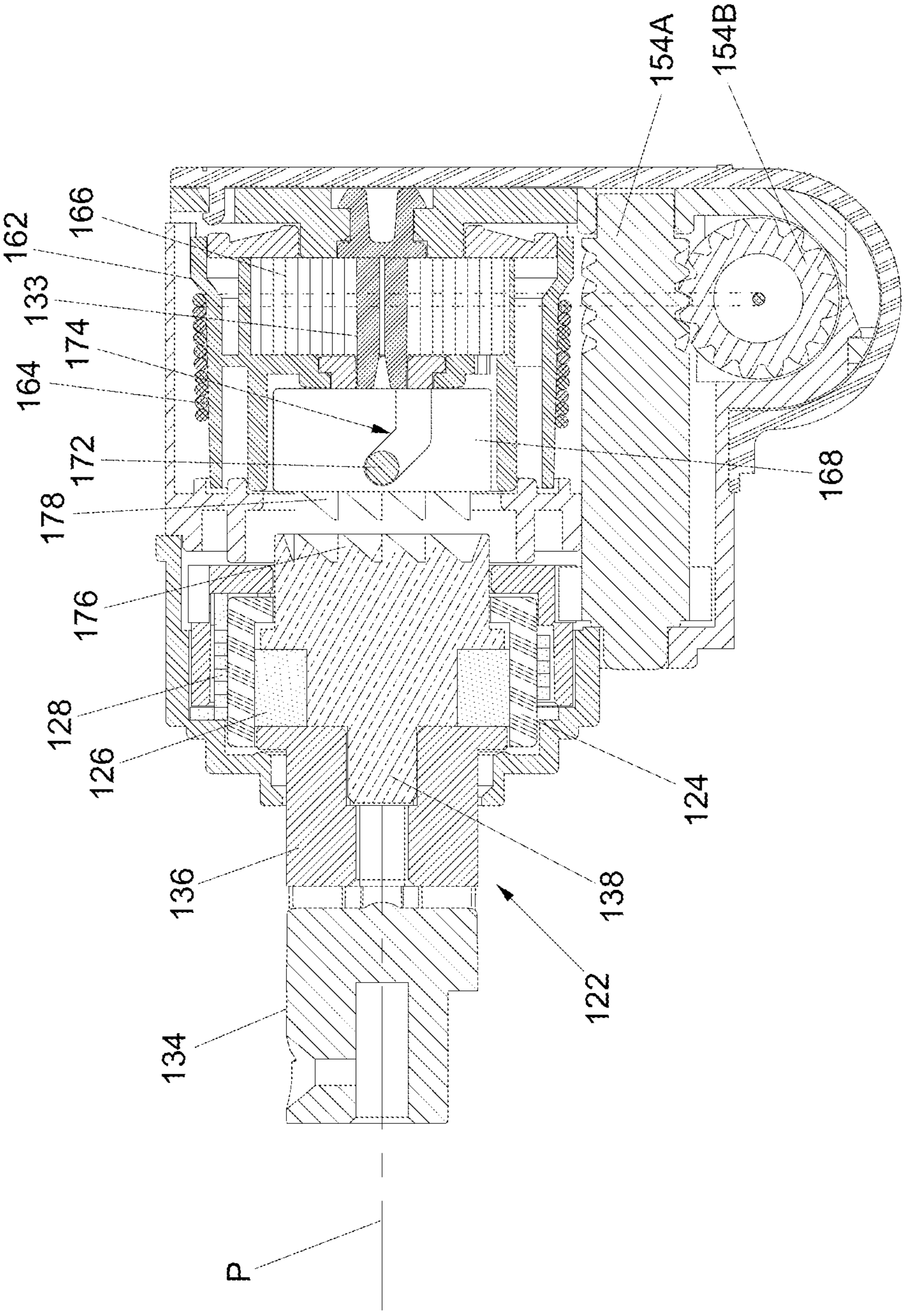
FIG. 8 is a cross-sectional view illustrating some construction details of the control module including a clutching part disengaged from an axle coupler.
Figure 9:
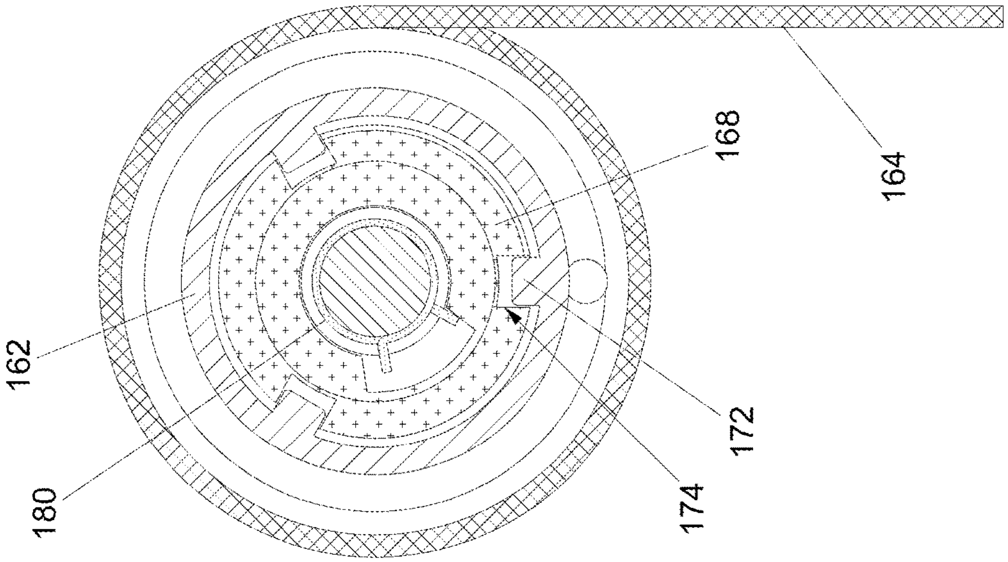
FIG. 9 is a cross-sectional view taken along a section plane perpendicular to that of FIG. 8 illustrating further construction details including the clutching part connected with a spool in the control module.
Figure 10:
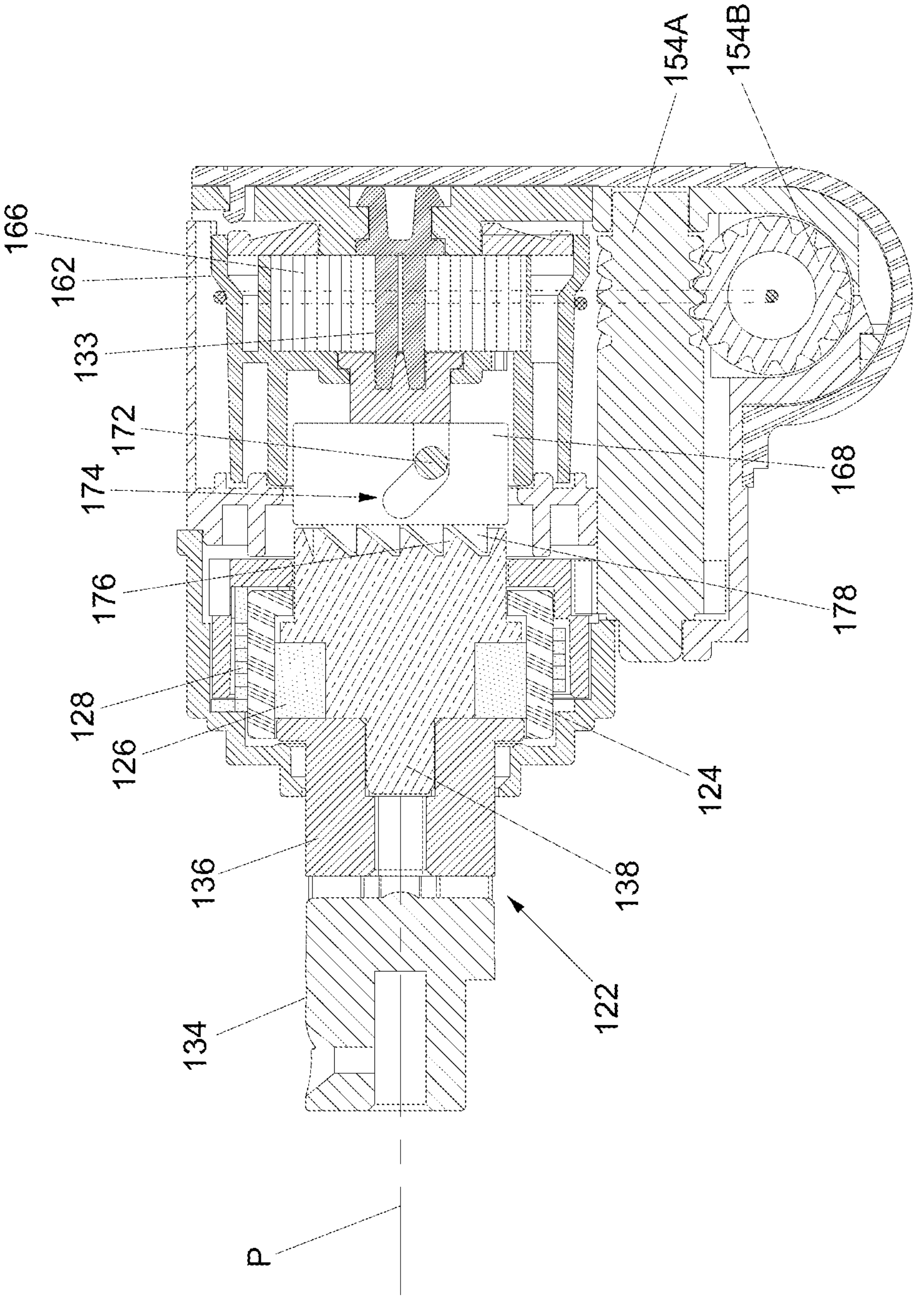
FIG. 10 is a cross-sectional view illustrating the control module as shown in FIG. 8 in a state where the clutching part is engaged with the axle coupler.
Figure 11:
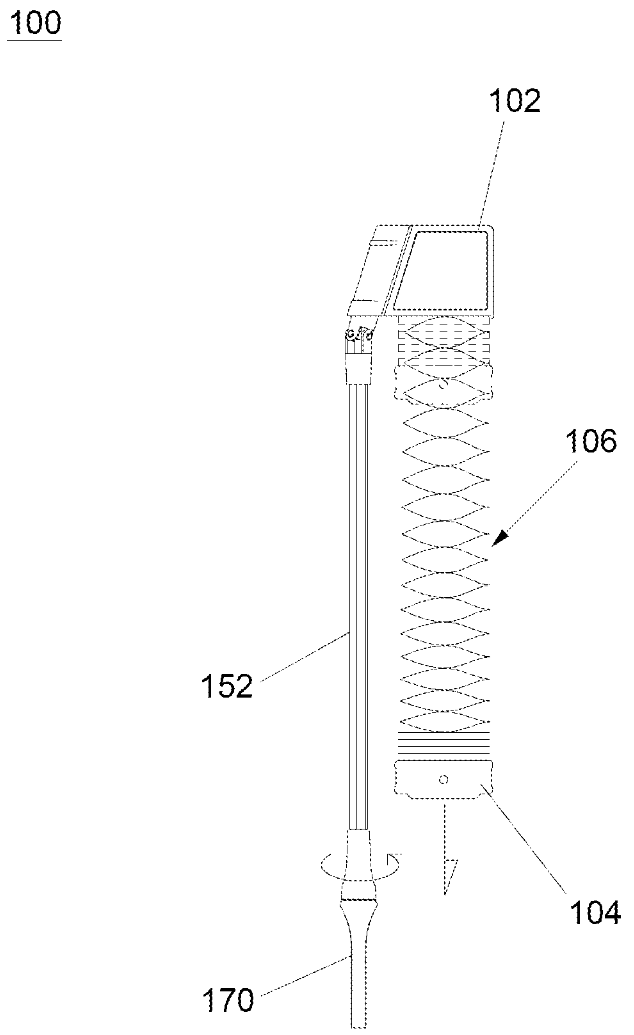
FIGS. 11 and 12 are schematic views illustrating exemplary operation for lowering a movable rail of the window shade.
Figure 12:
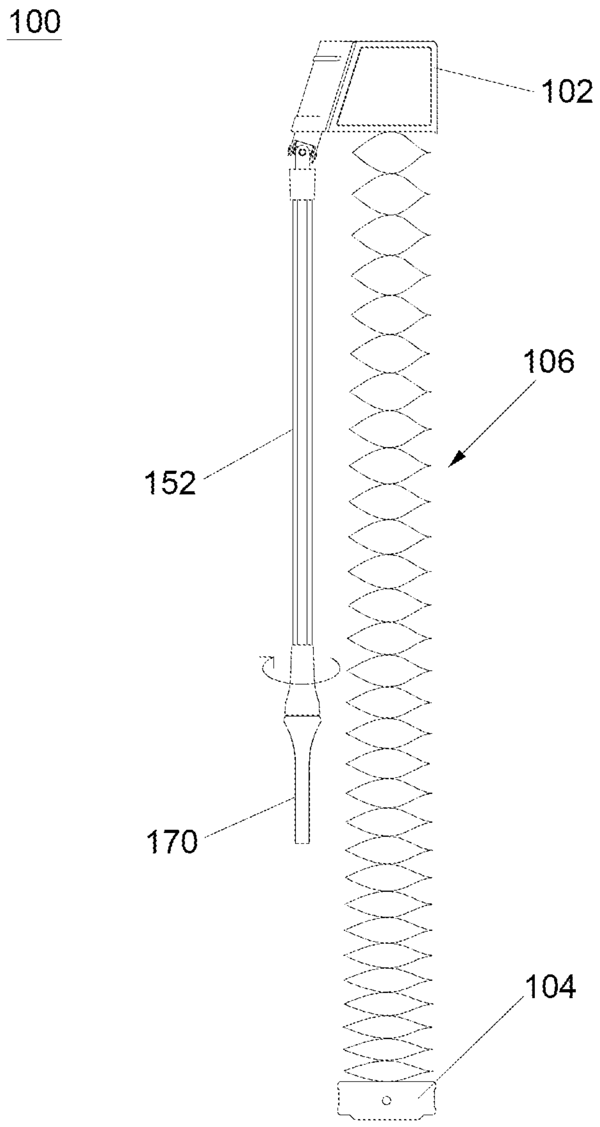
Figure 13:
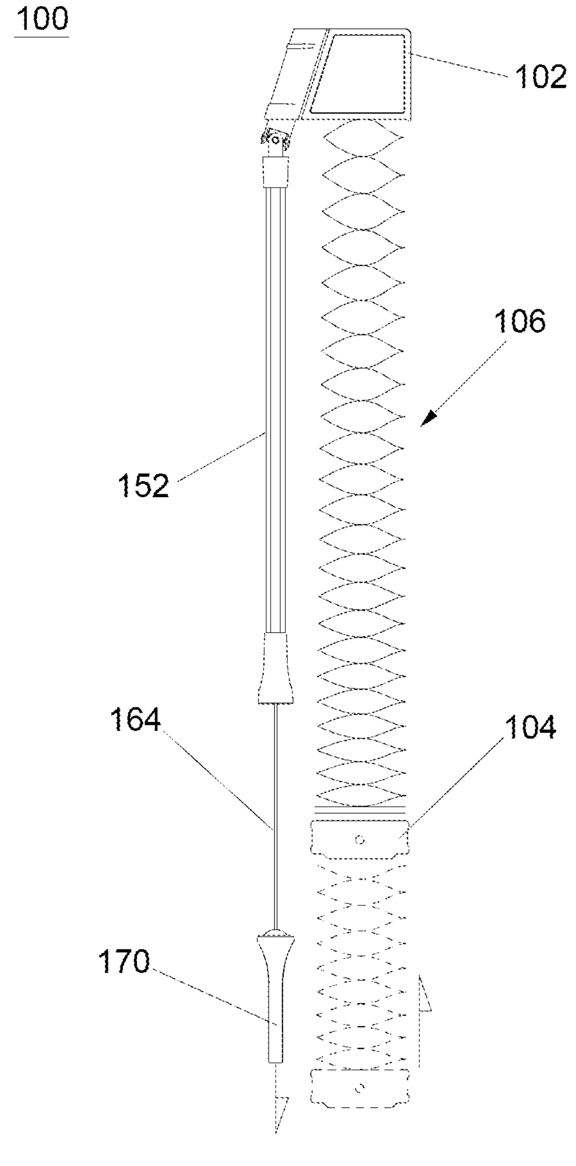
FIGS. 13 and 14 are schematic views illustrating exemplary operation for raising the movable rail of the window shade.
Figure 14:
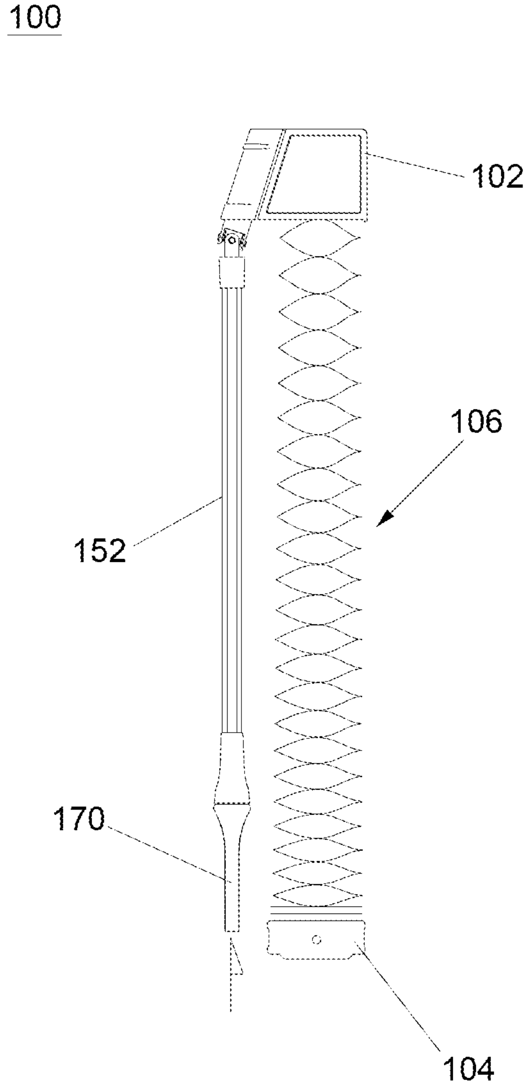
Figure 15:
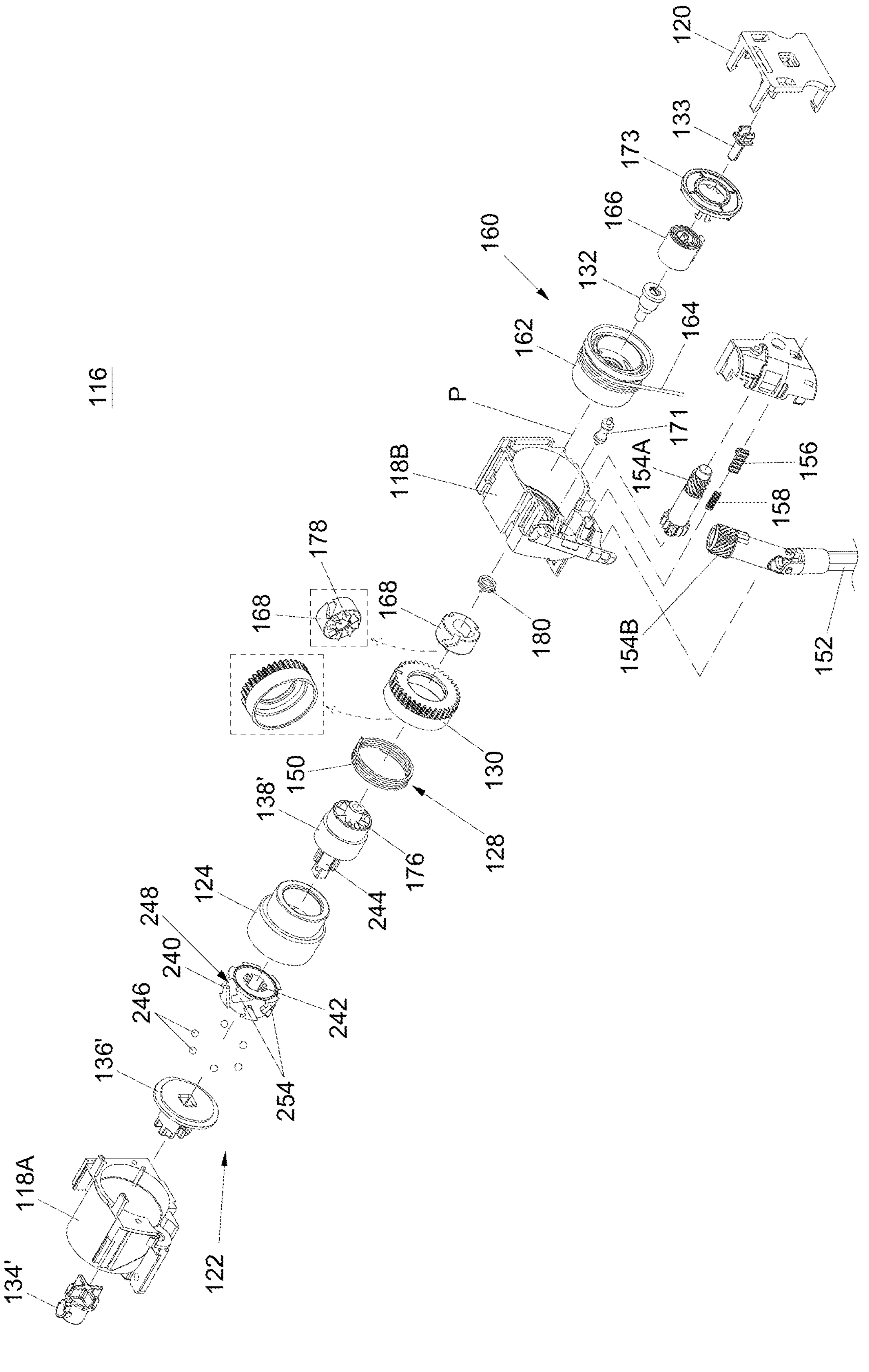
FIG. 15 is an exploded view illustrating a variant construction of the control module.
Figure 16:
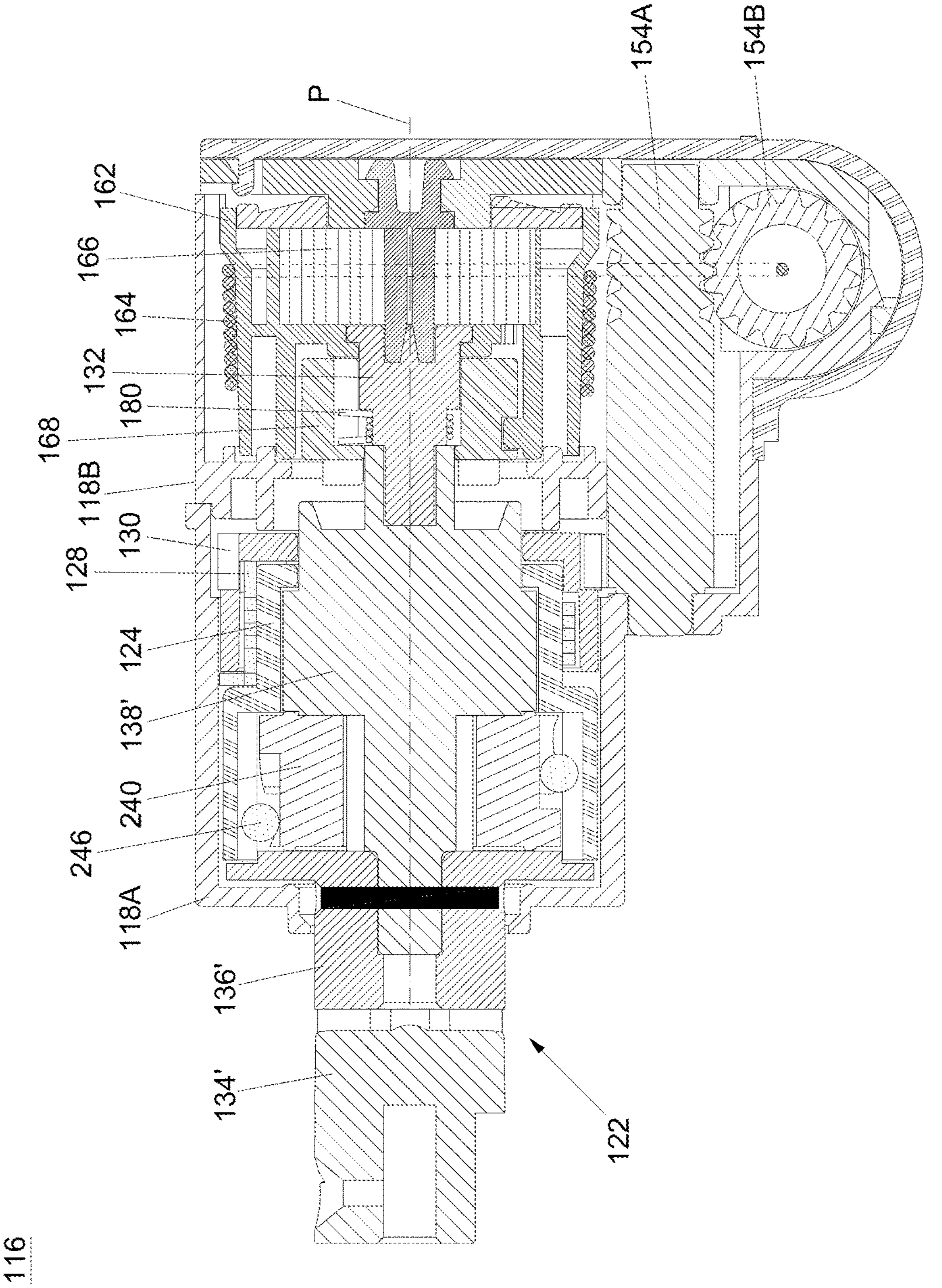
FIG. 16 is a cross-sectional view illustrating the control module of FIG. 15.
Figure 17:
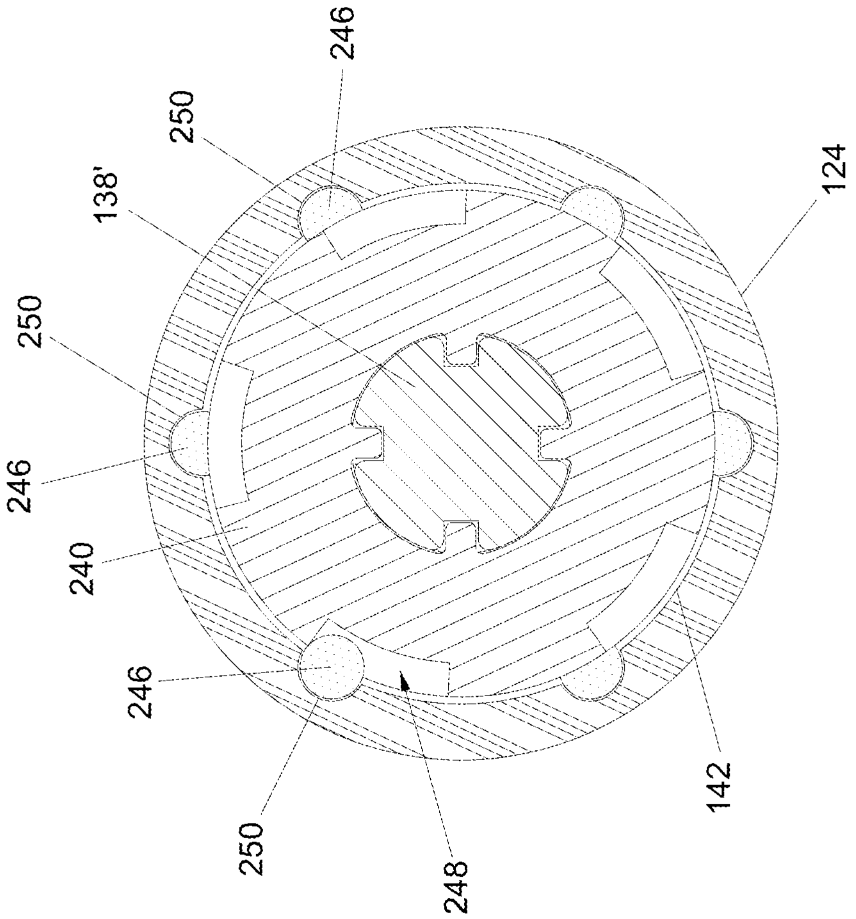
FIG. 17 is a cross-sectional view taken along a section plane perpendicular to that of FIG. 16 illustrating the assembly of an axle coupler, a sleeve and engaging parts in the control module of FIG. 15.
Figure 18:
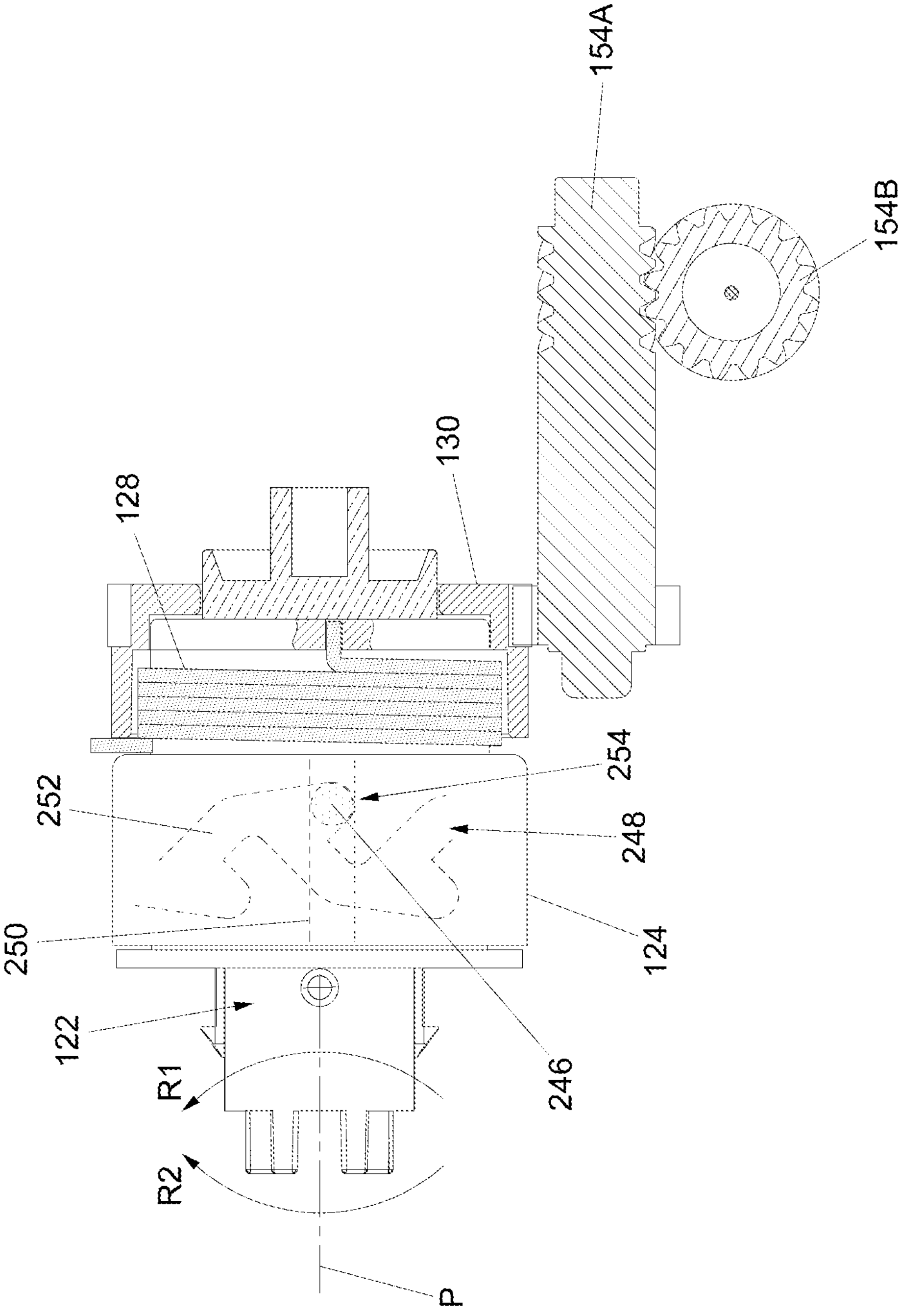
FIG. 18 is a schematic view illustrating further construction details of the control module of FIG. 15.

Referring to FIGS. 3, 4 and 8-10, the clutching part 168 is connected with the spool 162, and is disposed inside the housing 118 for rotating about the rotation axis P and sliding axially along the rotation axis P. According to an example of construction, the spool 162 can include an inward protruding key 172 that is slidably received in a guide slot 174 provided on an outer surface of the clutching part 168 so that a rotation of the spool 162 around the rotation axis P can cause the clutching part 168 to rotate about the rotation axis P and slide along the rotation axis P toward or away from the axle coupler 122. Accordingly, a rotation of the spool 162 for winding the pull member 164 can cause the clutching part 168 to move away and disengage from the axle coupler 122, and a rotation of the spool 162 for unwinding the pull member 164 can cause the clutching part 168 to move toward and engage with the axle coupler 122. According to an example of construction, the axle coupler 122 has an end provided with a plurality of teeth 176, and the clutching part 168 includes a plurality of teeth 178 facing the teeth 176, the teeth 176 being exemplarily provided on the coupling part 138 of the axle coupler 122. The teeth 178 of the clutching part 168 can be engaged with the teeth 176 of the axle coupler 122 for rotationally coupling the drive unit 160 to the axle coupler 122 (as shown in FIG. 10), and can be disengaged from the teeth 176 for rotationally decoupling the drive unit 160 from the axle coupler 122 (as shown in FIG. 8). The clutching part 168 may connect with a torsion spring 180 that is tightly disposed around the fixed shaft 132, whereby the torsion spring 180 can provide some resistance for assisting in keeping the clutching part 168 in a position disengaged from the axle coupler 122.

In conjunction with FIGS. 1-10, FIGS. 11 and 12 are schematic views illustrating exemplary operation for lowering the movable rail 104 of the window shade 100. Referring to FIGS. 1-12, when a user wants to lower the movable rail 104, the control wand 152 can be gently rotated to drive a rotational displacement of the brake releasing part 130, which causes the braking part 128 to release the sleeve 124 for rotation. Because the axle coupler 122 and the sleeve 124 are rotationally locked to each other in the direction R1 by the coupling position of each engaging part 126 as described previously, the rotary axle 112, the axle coupler 122 and the sleeve 124 can accordingly rotate in unison in the direction R1 as the movable rail 104 moves downward under gravity for expanding the shading structure 106. Once the movable rail 104 moving downward reaches a desired height, the control wand 152 can be released, and the braking part 128 can block rotation of the rotary axle 112, the axle coupler 122 and the sleeve 124 in the direction R1 for holding the movable rail 104 in position.

In conjunction with FIGS. 1-10, FIGS. 13 and 14 are schematic views illustrating exemplary operation for raising the movable rail 104 of the window shade 100. Referring to FIGS. 1-10, 13 and 14, a user can pull the handle 170 and the pull member 164 downward for raising the movable rail 104. As a result, the spool 162 can rotate in the direction R2 for unwinding the pull member 164. This rotation of the spool 162 causes the clutching part 168 to engage with the axle coupler 122. As the spool 162 continuously rotates in the direction R2, the rotary axle 112 and the axle coupler 122 can rotate along with the spool 162 in the direction R2 for raising the movable rail 104 while the sleeve 124 is kept stationary by the braking part 128. The engaging parts 126 can remain in contact with the axle coupler 122 and the sleeve 124 while moving along with the axle coupler 122 in the direction R2, wherein the contact provided by the engaging parts 126 can reduce friction so that the operation for raising the movable rail 104 can be facilitated and component wear can be reduced.

FIGS. 15-18 are various schematic views illustrating a variant embodiment of the control module 116 that differs from the previous embodiment in the construction of the mechanism used for rotationally coupling and decoupling the axle coupler 122 with respect to the sleeve 124. Referring to FIGS. 15-18, the axle coupler 122 can include a plurality of coupling parts 134', 136' and 138' that are rotationally coupled to one another for rotation about the rotation axis P, wherein the teeth 176 of the axle coupler 122 adapted to engage with the clutching part 168 can be provided on the coupling part 138'. Like in the previous embodiment, the use of multiple coupling parts 134', 136' and 138' may facilitate the assembly of the axle coupler 122. Moreover, the axle coupler 122 can include an additional coupling part 240 that is rotationally coupled to the coupling part 138' for rotation about the rotation axis P. For example, the coupling part 240 can have an opening 242, and the coupling part 138' can include a shaft portion 244 adapted to insert into the opening 242 for rotationally coupling the coupling part 240 to the coupling part 138'. Although the coupling parts 138' and 240 have been described as two components assembled together, it will be appreciated that the coupling parts 138' and 240 may also be formed integrally as a single part.

Like previously described, a plurality of engaging parts 246 are provided for rotationally coupling the axle coupler 122 to the sleeve 124 in the direction of rotation R1 and rotationally decoupling the axle coupler 122 from the sleeve 124 in the opposite direction of rotation R2. The engaging parts 246 can substitute for the engaging parts 126 of the previous embodiment. More specifically, each engaging part 246 can likewise have a coupling position with respect to the axle coupler 122 where the axle coupler 122 and the sleeve 124 are locked to each other in the direction of rotation R1, and the engaging part 246 is movable relative to the axle coupler 122 away from the coupling position for rotation of the axle coupler 122 relative to the sleeve 124 in the direction R2 opposite to the direction RE Like previously described, the direction of rotation R1 can correspond to lowering of the movable rail 104, and the direction of rotation R2 can correspond to raising of the movable rail 104.

Referring to FIGS. 15-18, the engaging parts 246 are disposed between the axle coupler 122 and the inner surface 142 of the sleeve 124, and are angularly spaced apart from one another around the rotation axis P. The engaging parts 246 are adapted to be in rolling contact with the axle coupler 122 and the inner surface 142 of the sleeve 124, and can exemplarily include balls. According to the construction of FIGS. 15-18, the axle coupler 122 has an outer surface provided with a guide track 248 that extends circumferentially around the rotation axis P, and the inner surface 142 of the sleeve 124 has a plurality of guide slots 250 respectively associated with the engaging parts 246 that are angularly spaced apart from one another around the rotation axis P. The guide track 248 can be exemplarily provided on the coupling part 240. Each guide slot 250 extends generally linear and parallel to the rotation axis P and overlaps partially with the guide track 248. Each engaging part 246 is movably disposed in the guide slot 250 associated therewith and the guide track 248.

The guide track 248 can have a loop portion 252, and a plurality of stop regions 254 that are connected with the loop portion 252. Each stop region 254 can be exemplarily formed as a recessed region in the loop portion 252. Each engaging part 246 may be engaged with one of the stop regions 254 in the coupling position to rotationally lock the axle coupler 122 to the sleeve 124 in the direction of rotation R1, and can move relative to the axle coupler 122 along the loop portion 252 and relative to the sleeve 124 along the guide slot 250 when the axle coupler 122 rotates relative to the sleeve 124 in the direction R2.

Other than the aforementioned elements, the other components of the control module 116 shown in FIGS. 15-18 are similar to the previous embodiment and operate in a same way.

In conjunction with FIGS. 15-18, FIG. 19 is a planar projection view illustrating one engaging part 246 in the coupling position engaged with one stop region 254 of the guide track 248. For the sake of clarity, FIG. 19 only shows one engaging part 246 and omits the representation of the other engaging parts 246. Referring to FIGS. 15-19, when the engaging part 246 is in the coupling position, the axle coupler 122 can be rotationally locked to the sleeve 124 in the direction of rotation R1 so that the braking force applied by the braking part 128 can prevent rotation of the axle coupler 122 and the sleeve 124 in the direction R1. The movable rail 104 (better shown in FIGS. 1 and 2) can be thereby held in position. For lowering the movable rail 104, the control wand 152 can be operated like described previously to cause the braking part 128 to release the sleeve 124, whereby the axle coupler 122 and the sleeve 124 can rotate in unison relative to the braking part 128 in the direction R1 as the movable rail 104 lowers by gravity action.

Figure 19:
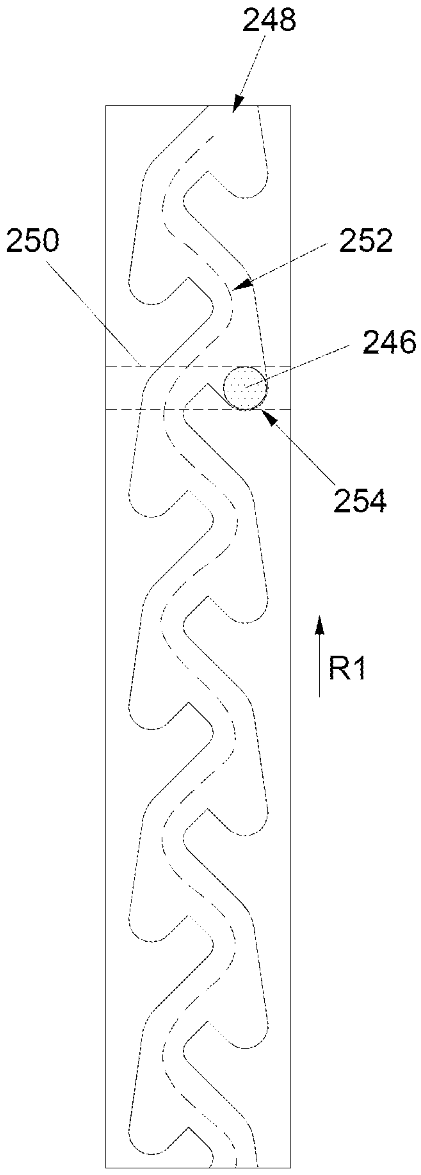
FIG. 19 is a planar projection view illustrating one engaging part of the control module shown in FIG. 15 in a coupling position.
Figure 20:
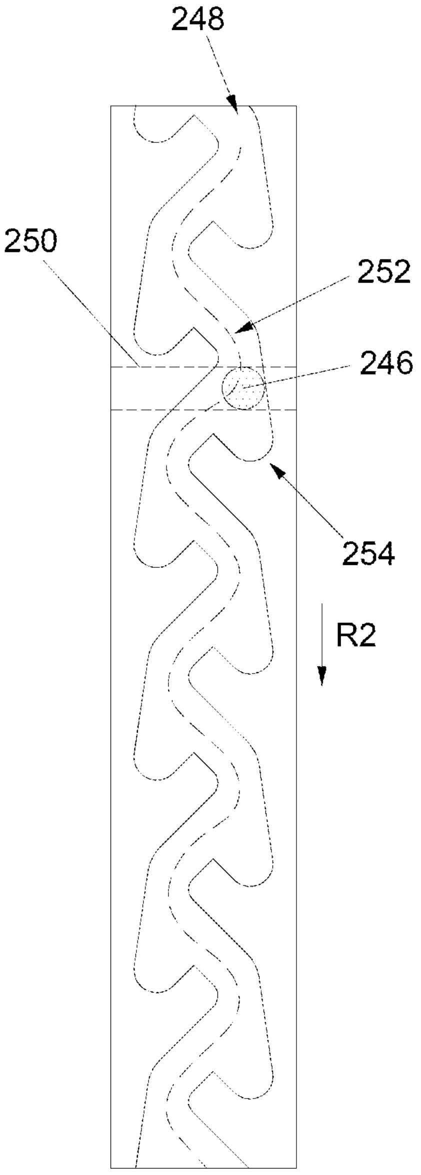
FIG. 20 is a planar projection view illustrating the engaging part displaced away from the coupling position.

FIG. 20 is a planar projection view illustrating the engaging part 246 of FIG. 19 traveling along the loop portion 252 of the guide track 248 and along the guide slot 250 as the axle coupler 122 rotates relative to the sleeve 124 in the direction R2. Referring to the FIGS. 15-20, when the pull member 164 of the drive unit 160 is operated for raising the movable rail 104 (better shown in FIGS. 1 and 2), the axle coupler 122 can rotate in the direction R2 relative to the sleeve 124, and the sleeve 124 can be held stationary by the braking part 128. As the axle coupler 122 continuously rotates in the direction R2, the engaging part 246 can continuously move along the loop portion 252, wherein the contact provided by the engaging part 246 can reduce friction so that the operation for raising the movable rail 104 can be facilitated and component wear can be reduced. Once the movable rail 104 reaches a desired height, the pull member 164 can be released and wound around the spool 162, and the engaging part 246 can recover the coupling position owing to a rotational displacement of the axle coupler 122 in the direction R1 induced by the weight of the movable rail 104. The axle coupler 122 and the sleeve 124 can be thereby rotationally locked to each other in the direction R1, and can be stopped by the braking force applied by the braking part 128 on the sleeve 124.

Advantages of the structures described herein include the ability to provide an actuating system operable to lower and raise a movable rail of a window shade with reduced effort. Since the actuating system has a construction that reduces internal friction during operation, component wear can be reduced and service life can be expanded.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
- a sleeve having an inner surface;
- a braking part operable to apply a braking force for preventing rotation of the sleeve around a rotation axis;
- a brake releasing part connected with the braking part, the brake releasing part being operable to cause the braking part to release the braking force for rotation of the sleeve;
- an axle coupler disposed through an interior of the sleeve, the axle coupler being rotatable around the rotation axis for raising and lowering a movable rail of a window shade; and
- at least an engaging part disposed between the axle coupler and the inner surface of the sleeve, the engaging part being adapted to be in rolling contact with the axle coupler and the inner surface of the sleeve;
- wherein the engaging part has a coupling position with respect to the axle coupler where the sleeve and the axle coupler are locked to each other in a first direction of rotation, and the engaging part is movable relative to the axle coupler away from the coupling position for rotation of the axle coupler relative to the sleeve in a second direction of rotation opposite to the first direction of rotation; and
- wherein the sleeve and the axle coupler are rotatable in unison in the first direction with the engaging part in the coupling position as the braking part releases the sleeve by operation of the brake releasing part.

2. The actuating system according to claim 1, wherein the engaging part includes a rolling pin or a ball.

3. The actuating system according to claim 1, wherein the axle coupler has a notch, and the inner surface of the sleeve and the notch of the axle coupler at least partially define a gap in which the engaging part is confined.

4. The actuating system according to claim 3, wherein the notch has a notch surface that extends along a secant line of the inner surface.

5. The actuating system according to claim 4, wherein the engaging part is displaced toward an end of the notch surface adjacent to the inner surface in the coupling position.

6. The actuating system according to claim 1, further including a spring respectively connected with the engaging part and the axle coupler, the spring biasing the engaging part toward the coupling position.

7. The actuating system according to claim 1, wherein the axle coupler has an outer surface provided with a guide track that extends around the rotation axis, and the inner surface of the sleeve has a guide slot extending generally parallel to the rotation axis and overlapping partially with the guide track, the engaging part being movably disposed in the guide track and the guide slot.

8. The actuating system according to claim 7, wherein the guide track has a loop portion and a stop region connected with each other, the engaging part being engaged with the stop region in the coupling position.

9. The actuating system according to claim 8, wherein the engaging part moves relative to the axle coupler along the loop portion and relative to the sleeve along the guide slot when the axle coupler rotates relative to the sleeve in the second direction.

10. The actuating system according to claim 1, wherein the braking part includes a braking spring that is disposed around the sleeve and has an end connected with the brake releasing part, the braking spring being in frictional contact with the sleeve to prevent rotation of the sleeve, and the brake releasing part being operable to cause the braking spring to loosen the frictional contact with the sleeve.

11. The actuating system according to claim 10, further including a control wand connected with the brake releasing part via a plurality of transmission elements, the control wand being operable to cause the brake releasing part to rotate around the rotation axis and thereby urge the braking spring to loosen the frictional contact with the sleeve.

12. The actuating system according to claim 11, wherein the control wand is rotatable around a lengthwise axis thereof for urging the braking spring to loosen the frictional contact with the sleeve, and one of the transmission elements is coupled to a biasing spring that exerts a spring force for assisting the control wand to recover an initial position when no external force is applied thereon.

13. The actuating system according to claim 1, further including a drive unit operable to rotationally couple to and rotationally decouple from the axle coupler, the drive unit being rotationally coupled to the axle coupler for urging the axle coupler to rotate in the second direction of rotation.

14. The actuating system according to claim 13, wherein the drive unit includes a spool and a clutching part connected with each other, and a pull member connected with the spool, the spool being rotatable for winding and unwinding the pull member, a rotation of the spool for winding the pull member causing the clutching part to disengage from the axle coupler, and a rotation of the spool for unwinding the pull member causing the clutching part to engage with the axle coupler.

15. The actuating system according to claim 14, wherein the drive unit further includes a spring connected with the spool, the spring being adapted to bias the spool in rotation for winding the pull member.

16. The actuating system according to claim 14, wherein the axle coupler has an end provided with a plurality of first teeth, and the clutching part includes a plurality of second teeth facing the first teeth, the second teeth being engaged with the first teeth for rotationally coupling the drive unit to the axle coupler and disengaged from the first teeth for rotationally decoupling the drive unit from the axle coupler.

17. The actuating system according to claim 1, wherein the axle coupler is rotatable relative to the sleeve in the second direction for raising a movable rail of a window shade.

18. The actuating system according to claim 1, wherein the brake releasing part is operable to cause the braking part to release the braking force so that the sleeve and the axle coupler are rotatable in unison in the first direction for lowering a movable rail of a window shade.

19. A window shade comprising:

a head rail having a rotary axle;

a movable rail suspended from the head rail and coupled to the rotary axle, the rotary axle being rotatable for raising and lowering the movable rail; and the actuating system according to claim 1, wherein the axle coupler is rotationally locked to the rotary axle.

20. The window shade according to claim 19, wherein the movable rail is a bottom part of the window shade.

* * * * *